Nov. 27, 1923.
A. A. LOVEJOY
WRIST PIN LOCK
Filed Jan. 31, 1923
1,475,346
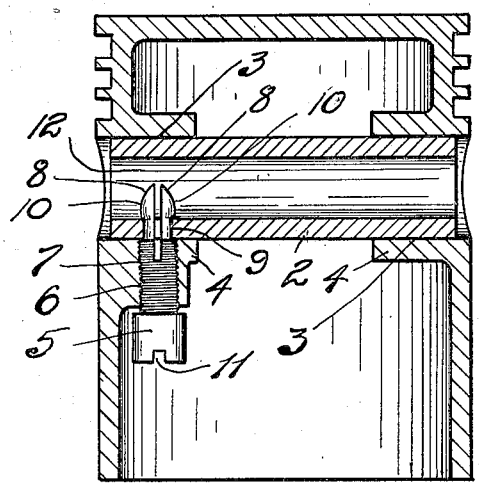
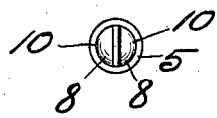
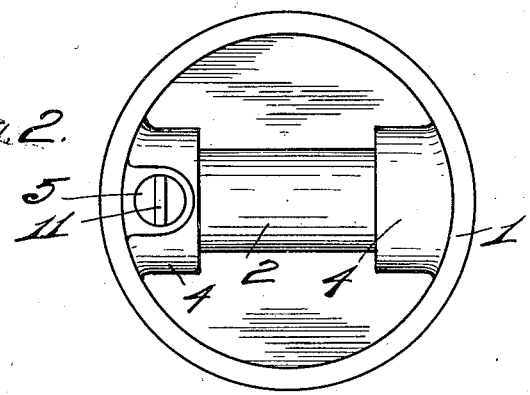
INVENTOR.
Alfred A. Lovejoy
BY George J. Oetsch
ATTORNEY.

Patented Nov. 27, 1923.

1,475,346

UNITED STATES PATENT OFFICE.

ALFRED A. LOVEJOY, OF SOUTH BEND, INDIANA.

WRIST-PIN LOCK.

Application filed January 31, 1923. Serial No. 616,087.

*To all whom it may concern:*

Be it known that I, ALFRED A. LOVEJOY, a citizen of the United States, residing at South Bend, in the county of St. Joseph and State of Indiana, have invented certain new and useful Improvements in Wrist-Pin Locks, of which the following is a specification.

The invention relates to wrist pin locks, for locking wrist pins in pistons, and has for its object to provide a device of this character threaded radially through the boss of a piston, and provided with a split end having enlargements thereon, and adapted to be forced through an aperture in the wrist pin to a position where the enlargements will engage over the inner edges of the aperture and prevent retrograde rotation of the screw.

A further object is to provide a wrist pin lock for locking a wrist pin to the boss of a piston and comprising a threaded bolt threaded through the boss and having spaced arms provided with enlargements adapted to be forced through an aperture in the wrist pin and engage the inner edges of the aperture for preventing unscrewing of the bolt.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a vertical transverse sectional view through a piston and wrist pin, showing the locking device applied thereto.

Figure 2 is a bottom plan view of the piston.

Figure 3 is a view showing the split end of the locking bolt.

Referring to the drawing, the numeral 1 designates a conventional form of piston of the type used in connection with internal combustion engines, and 2 a hollow wrist pin extending transversely of the piston and mounted in apertures 3 of inwardly extending axially aligned bosses 4. It has been found that devices for holding wrist pins in position are not positive in their operation and soon work loose, thereby allowing axial movement of the wrist pin 2 to a position where it will score the walls of the cylinder of an engine. To overcome this difficulty the screw 5 is provided, which screw has its threaded shank 6 threaded through the boss 4 at 7. The end of the shank 6 terminates in spaced spring arms 8, which spring arms, when the screw is threaded inwardly, are forced through an aperture 9 in the wrist pin to a position where their outwardly bulged portions 10 will engage over the opposite edges of the aperture 9 and hold the screw against retrograde rotation incident to vibration and rapid reciprocation of the piston when in operation. It will be seen that the screw is positively held in place, as well as the wrist pin and when it is desired to remove the pin a heavy screw driver may be placed in the groove 11 of the screw head and considerable power applied thereto to spring the arms inwardly by forcing the bulged portions 10 outwardly through the aperture 9, however if so desired an instrument may be inserted into the chamber 12 of the wrist pin and the ends of the arms forced together and held together until the bulged portions 10 pass into the aperture 9, after which the screw can be easily unscrewed.

From the above it will be seen that a locking device is provided for wrist pins, which may be easily applied, is positive in its holding operation and one wherein the wrist pin is positively held against axial or rotative movement.

The invention having been set forth what is claimed as new and useful is:—

The combination with a wrist pin having a chamber therein, said wrist pin extending through a boss of the piston, of a locking device for said wrist pin, said locking device comprising a member extending through the side of the boss and having its end extending through a registering aperture in the chambered wrist pin, said end being split thereby forming spring arms, and lugs carried by the spring arms and overlying the inner edges of the aperture, and disposed within the chamber of the wrist pin.

In testimony whereof I affix my signature.

ALFRED A. LOVEJOY.